(12) United States Patent
Hu et al.

(10) Patent No.: US 11,459,880 B2
(45) Date of Patent: Oct. 4, 2022

(54) METHOD FOR EVALUATING DIFFERENCE IN GAS INJECTION EFFECT OF GAS INJECTION WELLS IN CARBONATE RESERVOIR

(71) Applicant: Southwest Petroleum University, Chengdu (CN)

(72) Inventors: Yisheng Hu, Chengdu (CN); Xuan Bai, Chengdu (CN); Ping Guo, Chengdu (CN); Jianfen Du, Chengdu (CN); Zhouhua Wang, Chengdu (CN); Huang Liu, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 261 days.

(21) Appl. No.: 16/839,692

(22) Filed: Apr. 3, 2020

(65) Prior Publication Data
US 2020/0340356 A1  Oct. 29, 2020

(30) Foreign Application Priority Data
Apr. 26, 2019  (CN) .......................... 201910342352.8

(51) Int. Cl.
| | | |
|---|---|---|
| *E21B 49/00* | (2006.01) | |
| *E21B 43/16* | (2006.01) | |
| *E21B 47/06* | (2012.01) | |
| *G01V 99/00* | (2009.01) | |

(52) U.S. Cl.
CPC ............ *E21B 49/00* (2013.01); *E21B 43/168* (2013.01); *E21B 47/06* (2013.01); *E21B 49/008* (2013.01); *G01V 99/005* (2013.01)

(58) Field of Classification Search
CPC ...... E21B 49/00; E21B 49/008; E21B 43/164; E21B 43/166; E21B 43/168; E21B 2200/20; E21B 33/00
See application file for complete search history.

(56) References Cited

U.S. PATENT DOCUMENTS

| | | | | |
|---|---|---|---|---|
| 2011/0295581 | A1* | 12/2011 | Montaron ............... | E21B 49/00 703/10 |
| 2019/0204464 | A1* | 7/2019 | Moore, III ............... | G01V 1/30 |
| 2020/0157887 | A1* | 5/2020 | Alonso ................... | E21B 43/30 |

* cited by examiner

*Primary Examiner* — Kristyn A Hall
(74) *Attorney, Agent, or Firm* — Wenderoth, Lind & Ponack, L.L.P.

(57) ABSTRACT

The invention discloses a method for evaluating the difference in gas injection effect of gas injection wells in a carbonate reservoir, aiming at solving the problem that the difference in effect characters of gas injection wells cannot be systematically evaluated in the prior art, and realizing the purposes of systematically and completely evaluating the difference in gas injection effect in the carbonate reservoir and finding out the reason of low efficiency. By means of the invention, reasons for low gas injection efficiency corresponding to different geological classifications are obtained, systematic classification and induction are carried out on the difference in gas injection effect, and gas injection effects are effectively evaluated, so that a sufficient gas injection scheme design basis is provided for subsequent development and production increase, and a significant guiding principle is provided for later-stage gas injection and production increase of the carbonate reservoir.

10 Claims, 6 Drawing Sheets

METHOD FOR EVALUATING DIFFERENCE IN GAS INJECTION EFFECT OF GAS INJECTION WELLS IN CARBONATE RESERVOIR

TECHNICAL FIELD

The invention relates to the field of gas injection development of carbonate fractured-vuggy reservoirs, in particular to a method for evaluating the difference in gas injection effect of gas injection wells in a carbonate reservoir.

BACKGROUND

Fractured-vuggy carbonate reservoirs are characterized by deep burial, high temperature, complex reservoir space and irregular oil-water distribution. In view of the large number of failure wells and low-yield and low-efficiency wells in the later stage of waterflooding and high difficulty in the use of remaining reserves in fractured-vuggy carbonate reservoirs, the prior art has gradually begun to carry out the test and research on high-position attic remaining oil through gas injection. Initially, the test well effects showed that the gas injection method had gained phased success. However, as the gas injection and recovery efficiency of various oil fields entered the expanded test stage, with the increase of the number of gas injection wells, it is gradually revealed that the difference in gas injection effects is large, the effective characteristics of gas injection wells and the factors affecting gas injection effects are unclear, and there is no effective evaluation method for gas injection effects.

The effects of gas injection in the mine vary greatly. The difference is mainly shown in: (1) some wells have several thousand tons of oil increase in total after gas injection, while others have only increased a few tons; (2) when drilling gas injection wells with different reservoir space types, the gas injection effects are different; (3) when drilling gas injection wells with the same reservoir space type, the gas injection effects are quite different if the structural locations are different; and (4) under the condition that the current gas injection parameters are basically the same, the gas injection effects are very different. In the prior art, the difficulties in analyzing the effect characters of gas injection wells are mainly as follows: (1) the geological characteristics of gas injection wells are complex, and the types of reservoirs drilled are various; and (2) the oil increase effect through gas injection is a comprehensive reflection of many factors such as geological conditions, mining conditions, and injection and production parameters. Only a single factor or several factors cannot explain the reason for the large difference in gas injection effect.

After consulting a large number of literatures concerning production increase through gas injection, the applicant found that in the prior art, for gas injection wells, the oil increase effect of the gas injection wells can be evaluated by establishing grading evaluation standards for three indexes on site, that is, initial daily oil increasing capacity, average daily decline rate and cyclic oil increase. However, it is still impossible to analyze and evaluate the difference in effect characters of gas injection wells.

SUMMARY

The invention aims to provide a method for evaluating the difference in gas injection effect of gas injection wells in a carbonate reservoir, so as to solve the problem that the difference in effect characters of gas injection wells cannot be systematically evaluated in the prior art, and realize the purposes of systematically and completely evaluating the difference in gas injection effect in the carbonate reservoir and finding out the reason of low efficiency.

The invention is realized by the following technical scheme:

A method for evaluating the difference in gas injection effect of gas injection wells in a carbonate reservoir comprises the following steps:

(a) dividing the karst types of different gas injection wells;

(b) identifying and classifying the reservoir types of different gas injection wells;

(c) carrying out geological classification on different gas injection wells based on karst type division and reservoir type identification and classification results, and selecting typical wells in each geological classification;

(d) extracting and comparing the production characteristics of the typical wells after gas injection takes effect, so as to obtain the difference in production characteristics;

(e) extracting and comparing the production performance change characteristics of the typical wells after gas injection, so as to obtain the difference in production performance change characteristics;

(f) carrying out statistics on cumulative oil production after gas injection of each typical well, and selecting inefficient wells; and according to the results of steps (d) and (e), analyzing the differences between the inefficient wells and non-inefficient wells in production characteristics and production performance change characteristics, so as to obtain the low efficiency reasons for geological classifications corresponding to different inefficient wells.

Aiming at the problems in the prior art that the effect characters of gas injection wells and the factors influencing the gas injection effect are not clear, there is no effective gas injection effect evaluation method available, and the difference in effect character of gas injection wells cannot be systematically evaluated, the invention provides a method for evaluating the difference in gas injection effect of gas injection wells in a carbonate reservoir, in particular with respect to the complex reservoir conditions in which pores, fractures and vugs are combined in the carbonate reservoir, different gas injection wells are divided according to karst type, identification and classification are carried out according to reservoir type, and the karst type and the reservoir type of the gas injection wells corresponding to each reservoir stratum are combined, so that the gas injection wells are classified by taking the karst type and the reservoir type as a whole, and typical wells are selected as objects for further evaluation in each geological classification. Specifically, the production characteristics of the typical wells after gas injection takes effect are extracted and compared, so as to obtain the difference in production characteristics, and the production performance change characteristics of the typical wells after gas injection are extracted and compared, so as to obtain the difference in production performance change characteristics. After that, the inefficient wells are selected according to the cumulative oil production after gas injection of each typical well. According to the obtained results, the production characteristics and production performance change characteristics of the inefficient wells are extracted and compared with those of non-inefficient wells, so as to obtain the low efficiency reasons for geological classifications corresponding to different inefficient wells.

Preferably, for each geological classification, two typical wells can be selected, namely, one inefficient well and one non-inefficient well, thus further improving the coverage range of a final comparison sample of the present invention and allowing engineers to easily find out inefficient wells caused by non-geological reasons.

Preferably, the production characteristics include oil production, water cut and production pressure.

Preferably, the production performance change characteristics include cyclic oil production, validity period, water cut and wellhead oil pressure.

Preferably, a method for extracting the water cut in the production performance change characteristics comprises the following steps: making a water cut change diagram and a multi-cycle water cut change diagram before and after gas injection for different types of typical wells, and further making multi-cycle water cut change curves for different types of typical wells.

Preferably, the wellhead oil pressure in the production performance change characteristics includes pressure change during soaking and pressure change during production after gas injection.

Preferably, the selection criteria of the inefficient wells is as follows: based on the results of economic evaluation in the early stage of oil field development, the typical wells whose cumulative production does not reach an economic limit are selected as the inefficient wells.

Preferably, low efficiency is caused by one or more of the following four reasons: underdeveloped reservoir and small reserve scale; gas injection wells whose well overflow outlet is at the upper part of a reservoir according to a well-reservoir relationship; condensate gas cap effect; and insufficient gas injection. In actual production, even for the same type of gas injection wells, the oil increase effects after gas injection may be quite different. In this method, it is concluded that low efficiency is caused by one or more of the above four reasons, so as to realize systematic and standard evaluation of the difference in gas injection effect in the carbonate reservoir and find out the causes of low efficiency.

Preferably, during geological classification in step (c), karst type is taken as the main genesis and reservoir type as the auxiliary genesis.

Preferably, in step (c), different gas injection wells are divided into the following four types: weathering crust cave type, weathering crust fracture-vug type, fault-controlled cave type and fault-controlled fracture-vug type.

Preferably, in step (b), the reservoir types are identified through the fracture conditions encountered by the gas injection wells, seismic reflection characteristics and logging interpretation results, and include karst cave type, fracture-vug type and fracture type. Pores, vugs and fractures are commonly developed in carbonate rocks. Due to their different formation mechanisms, morphological characteristics and development scales, especially their different contributions to oil and gas enrichment and migration, a unified definition standard is required for various types of reservoir space. By comprehensively considering the fracture conditions encountered by the gas injection wells, seismic reflection characteristics, logging interpretation results and production performance, reservoirs are divided into the following three types: karst cave type, fracture-vug type and fracture type, so that a uniform definition standard is provided, and support is provided for smooth implementation of the method.

Compared with the prior art, the invention has the following advantages and beneficial effects:

1. The method for evaluating the difference in gas injection effect of the gas injection wells in the carbonate reservoir according to the invention solves the problem that the difference in effect characters of gas injection wells cannot be systematically evaluated in the prior art, and realizes the purposes of systematically and completely evaluating the difference in gas injection effect in the carbonate reservoir and finding out the reason of low efficiency.

2. According to the method for evaluating the difference in gas injection effect of the gas injection wells in the carbonate reservoir in the invention, reasons for low gas injection efficiency corresponding to different geological classifications are obtained, systematic classification and induction are carried out on the difference in gas injection effect, and gas injection effects are effectively evaluated, so that a sufficient gas injection scheme design basis is provided for subsequent development and production increase, and a significant guiding principle is provided for later-stage gas injection and production increase of the carbonate reservoir.

BRIEF DESCRIPTION OF THE DRAWINGS

The drawings described herein are used to provide a further understanding of the embodiments of the present invention and form a part of this application and do not constitute a limitation on the embodiments of the present invention. In the drawings.

DESCRIPTION OF THE EMBODIMENTS

Figure 1:
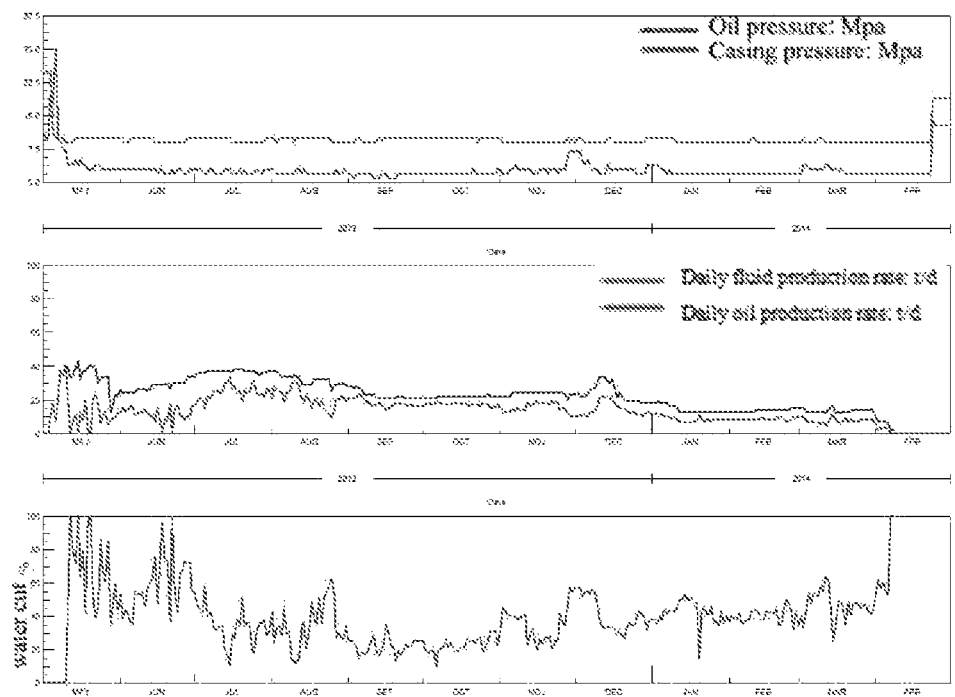
FIG. 1 is a production curve of a weathering crust cave type gas injection well.

In order to make the object, technical scheme and advantages of the present invention more clear, the present invention will be described in further detail below with reference to embodiments and drawings. The illustrative embodiments of the present invention and the description thereof are only for the purpose of explaining the present invention and are not intended to limit the present invention.

Embodiment 1

A method for evaluating the difference in gas injection effect of gas injection wells in a carbonate reservoir, taking 64 gas injection wells in an oil field as an example, comprises the following steps:

(a) Dividing the karst types of different gas injection wells:

The oilfield is bounded by a pinch-out line, the area north of the pinch-out line is a denudation area, which is mainly affected by weathering crust karstification, and the area south of the pinch-out line is mainly a covered area and controlled by faulting. A weathering crust karst reservoir mainly refers to the karst reservoir related to an unconformity surface formed by long-term weathering, denudation and leaching of Ordovician carbonate rocks. Meanwhile, controlled by the dynamic zoning of groundwater, the dissolution of the weathering crust karst reservoir often has the characteristic of vertical zoning, and the main fracture-vug development zone is usually located within 150 m-200 m below a weathering surface. The gas injection wells in the present embodiment are mostly located in the denudation area, with 34 wells in total, accounting for 73.9%.

Fault-controlled karst is formed by dissolution and filling after carbonate rocks are continuously buried. Under the covering condition, the fault-controlled karstification can expand the capacity and enhance the connectivity of early-stage karst fractures and vugs, and it also has the characteristics of being far away from a mechanical filling material source and strong dynamic force of confined water. Near a fault structural belt, the early-stage karst can form a good karst reservoir under the influence of water flowing through the fault structure, and the deep karst is well developed. A total of 12 gas injection wells are located in the fault-controlled karst covered area in the present embodiment, accounting for 26.1% of the total number.

(b) Identifying and classifying the reservoir types of different gas injection wells;

Pores, vugs and fractures are commonly developed in carbonate rocks. Due to their different formation mechanisms, morphological characteristics and development scales, especially their different contributions to oil and gas enrichment and migration, the reservoir types of different gas injection wells need to be identified and classified by comprehensively considering the fracture conditions encountered by the gas injection wells, seismic reflection characteristics, logging interpretation results and production performance.

(c) Carrying out geological classification on different gas injection wells based on karst type division and reservoir type identification and classification results, and selecting typical wells in each geological classification: one or more gas injection wells with the most obvious geological characteristics are selected as typical wells in each geological classification.

(d) Extracting and comparing the production characteristics of the typical wells after gas injection takes effect, so as to obtain the difference in production characteristics:

After studying the production performance curve of the typical gas injection wells after gas injection, it is found that the production characteristics of different types of gas injection wells are obviously different after gas injection takes effect. The difference is mainly manifested in three aspects, that is, oil production, water cut and production pressure. The analysis is as follows:

(1) Production Characteristics of Weathering Crust Cave Type Gas Injection Well (Taking Well A as an Example);

The weathering crust cave type reservoir is generally large in volume, and the flow mode of fluid is mainly cave flow. As shown in the production curve in FIG. 1, the production characteristics of this well after gas injection are as follows:

① cyclic oil production is high, initial production is large, a stable production period can be maintained, production decline is small, and the validity period is long;

② water cut is relatively low and fluctuates around 50%, and water cut can be reduced through liquid control; and ③ the pressure drops rapidly at the initial stage of production and remains stable after falling to a certain value.

Figure 2:
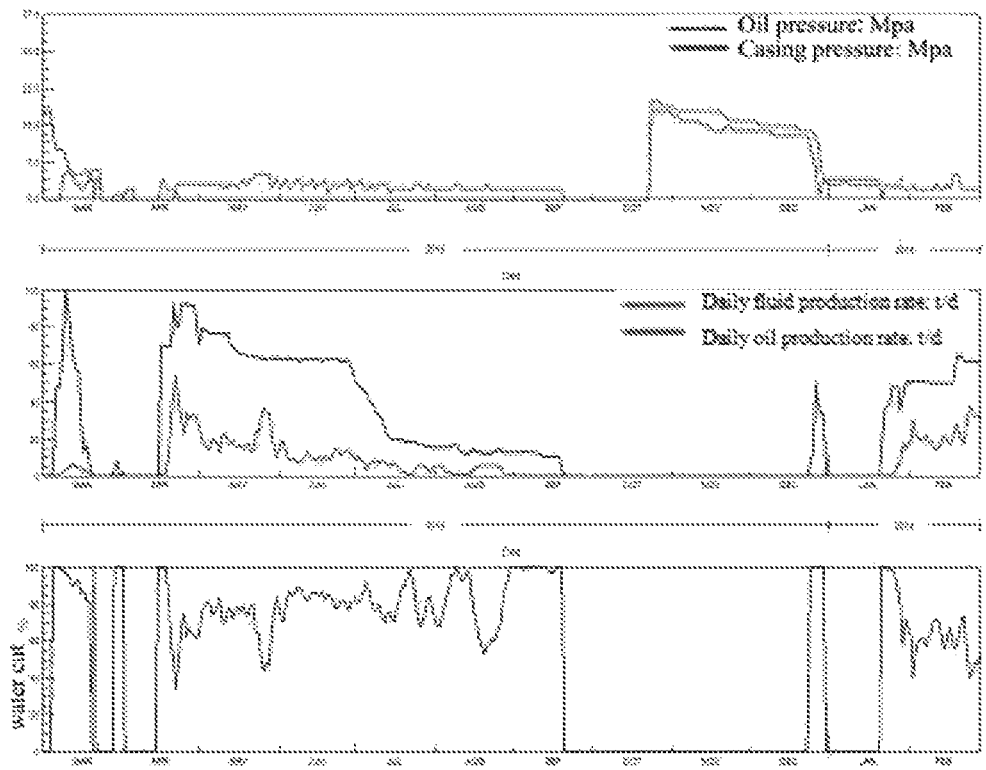
FIG. 2 is a production curve of a weathering crust fracture-vug type gas injection well.

(2) Production Characteristics of Weathering Crust Fracture-Vug Type Gas Injection Well (Taking Well B as an Example):

The effective flow characteristic scale of the weathering crust fracture-vug type reservoir is much smaller than that of the karst cave type reservoir, and the flow modes of fluid include high-speed non-Darcy flow and Darcy flow. As shown in the production curve in FIG. 2, the production characteristics of the well after gas injection are as follows:

① cyclic oil production is high, initial oil production is high, but production continues to decline, basically there is no stable production period, and the validity period is short;

② bottom water tends to dash along a high diversion channel, and water cut after well opening is generally high, fluctuating around 80%; and ③ during production, the pressure drops rapidly and the pressure level is low.

Figure 3:
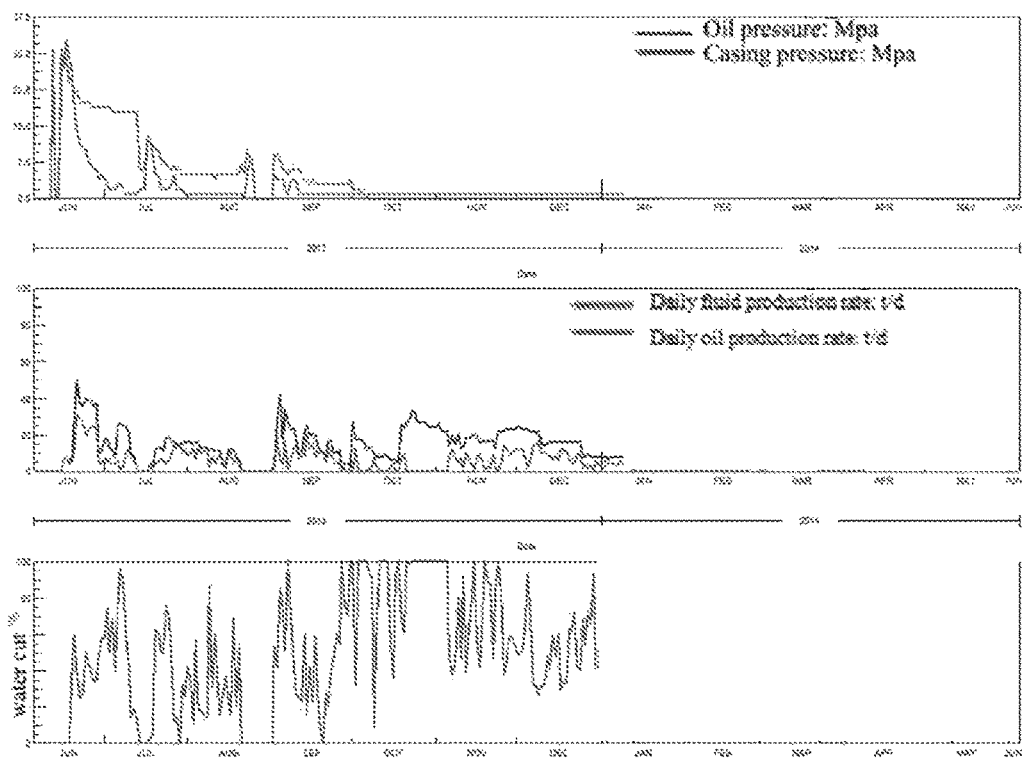
FIG. 3 is a production curve of a fault-controlled cave type gas injection well.

(3) Production Characteristics of Fault-Controlled Cave Type Gas Injection Well (Taking Well C as an Example):

The fault-controlled cave type reservoir is vertically developed and relatively small in volume. The flow mode of fluid is mainly cave flow. As shown in the production curve in FIG. 3, the production characteristics of the well after gas injection are as follows:

① cyclic oil production is low, initial production is high, production declines rapidly, production fluctuates greatly under the influence of the production system, and the validity period is long;

② water cut is relatively low and fluctuates greatly, and water cut can be reduced through liquid control; and ③ during production, the pressure drops rapidly.

Figure 4:
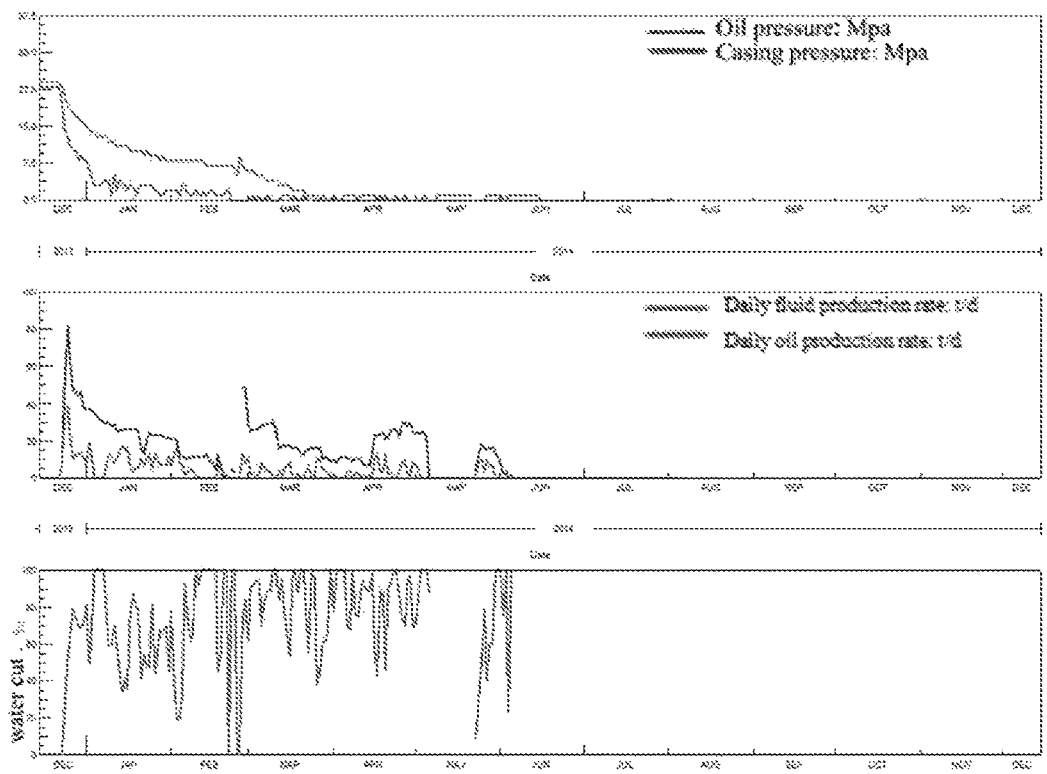
FIG. 4 is a production curve of a fault-controlled fracture-vug type gas injection well.

(4) Fault-Controlled Fracture-Vug Type Gas Injection Well (Taking Well D as an Example):

The fault-controlled fracture-vug type reservoir has a small scale and is characterized in fracture development. As shown in the production curve in FIG. 4, the production characteristics of the well after gas injection are as follows:

① cyclic oil production is low, daily oil production fluctuates at a low level, and the validity period is short;

② affected by fractures, water cut fluctuates at a high level; and

③ during production, the pressure drops rapidly.

Based on the above difference, the development indexes of different types of wells in the first cycle are further compared and analyzed (Table 1). It is concluded that in terms of production characteristics, the average daily oil production of karst cave type gas injection wells is higher than that of fracture-vug type gas injection wells, the water cut of karst cave type gas injection wells is lower than that of fracture-vug type gas injection wells, and the average oil pressure drop of weathering crust genesis gas injection wells is lower than that of fault-controlled genesis gas injection wells.

TABLE 1

Comparison Chart of Production Characteristics of Different
Types of Gas Injection Wells in First Cycle

| Type | | Daily oil output, t/d | Cumulative oil output, t | Validity period, d | Water cut, % | Pressure drop, MPa |
|---|---|---|---|---|---|---|
| Weathering crust | Karst cave type | 12 | 2549 | 240 | 45.5 | 10.8 |
| | Fracture-vug type | 9.3 | 1807 | 210 | 62.1 | 12.1 |
| Fault-controlled | Karst cave type | 11 | 1657 | 211 | 54.4 | 14.0 |
| | Fracture-vug type | 7.5 | 1582 | 186 | 68.5 | 15.5 |

(e) Extracting and Comparing the Production Performance Change Characteristics of the Typical Wells After Gas Injection, so as to Obtain the Difference in Production Performance Change Characteristics:

According to the geological classification results, the production performance change characteristics of different types of gas injection wells after gas injection are compared and analyzed from four indexes, namely, oil production, validity period, water cut and pressure.

Figure 6:
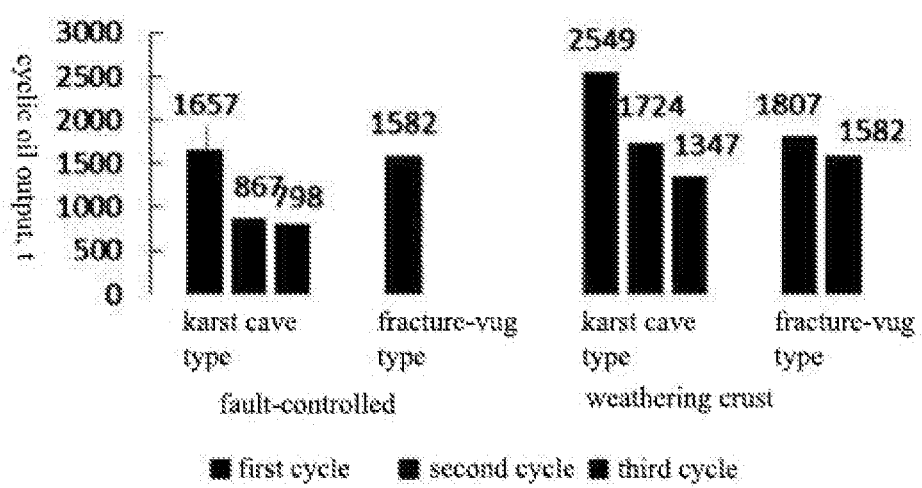
FIG. 6 is a multi-cycle cumulative oil production variation diagram of different types of gas injection wells.

(1) Oil Production:

In the present embodiment, the change of cyclic oil production is recorded for different types of gas injection wells. With the increase of the number of cycles, the cyclic oil production shows a trend of decreasing round by round. 40 wells completed the first cycle, 11 wells completed the second cycle, and only 3 wells completed the third cycle. Of the 11 wells which have completed the second cycle, 10 are of weathering crust genesis and only 1 is of fault-controlled genesis. The number of cycles for gas injection wells with weathering crust genesis is large. Statistical results of cyclic oil increase effects of different types of gas injection wells are shown in Table 2:

genesis gas injection wells. Under the same geological genesis, the oil production of karst cave type gas injection wells is higher than that of fracture-vug type gas injection wells. As can be seen from FIG. 6, the average cyclic oil increase decreases with the increase of gas injection cycle times for gas injection wells with different geneses. Weathering crust cave type gas injection wells have better average oil increasing effect in each cycle than other types.

Figure 7:
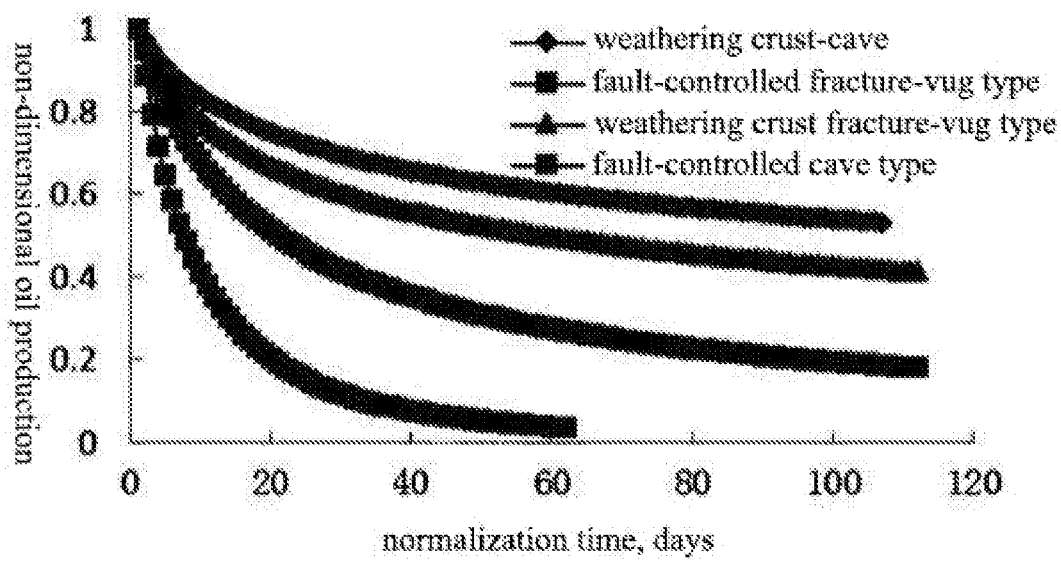
FIG. 7 is a comparison chart of production decline of different types of gas injection wells in the first cycle.

2) Analysis of Cyclic Production Decline:

By normalizing the oil production of different types of gas injection wells, production decline curves of different types of gas injection wells in the first cycle are made (FIG. 7). Comparing the production decline curves of different types of gas injection wells in the first cycle, it can be seen that the decline of weathering crust cave type gas injection wells is slight, weathering crust fracture-vug type gas injection wells take second place, and the decline of fault-controlled fracture-vug type gas injection wells is the fastest. Comparing the multi-cycle production decline curves of the gas injection wells, it can be seen that the cyclic decline rate increases

TABLE 2

Statistics on Cyclic Oil Increase Effect of Different Types of Gas Injection Wells

| | | First cycle | | | Second cycle | | | Third cycle | | | |
|---|---|---|---|---|---|---|---|---|---|---|---|
| Type | | Well number | Daily average oil production rate t | Daily average cumulative oil production rate t | Well number | Daily average oil production rate t | Daily average cumulative oil production rate t | Well number | Daily average oil production rate t | Daily average cumulative oil production rate t | Water cut at the final stage after gas injection t |
| Weathering crust | Karst cave type | 14 | 12 | 2549 | 5 | 11.4 | 1724 | 2 | 11 | 1347 | 3357 |
| | Fracture-vug type | 16 | 9.3 | 1807 | 5 | 10.6 | 1582 | | | | 2334 |
| Fault-controlled | Karst cave type | 5 | 11 | 1657 | 1 | 8 | 867 | 1 | 7 | 798 | 1990 |
| | Fracture-vug type | 5 | 7.5 | 1582 | | | | | | | 1582 |
| Total/Average | | 40 | 10.5 | 1947 | 11 | 10.6 | 1445 | 3 | 9.6 | 1134 | 2848 |

Figure 5:
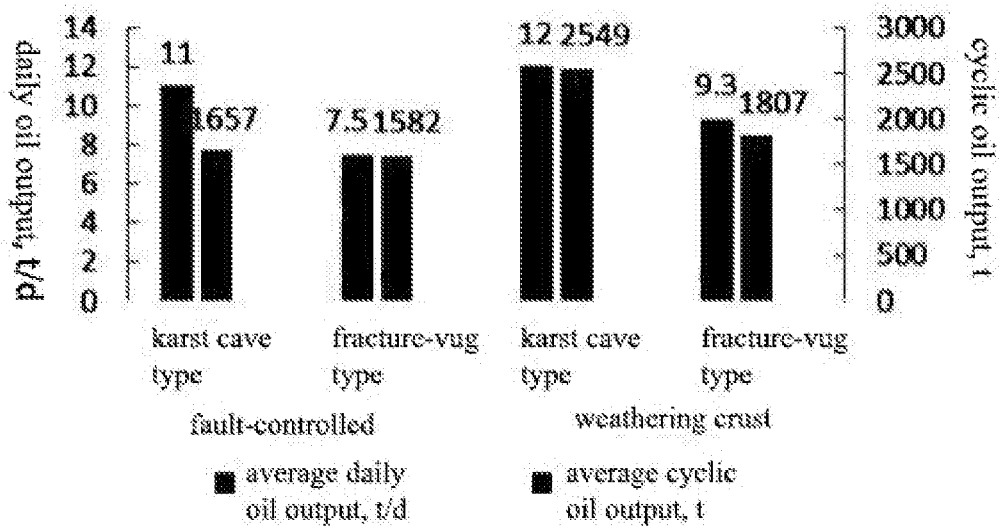
FIG. 5 is a comparison chart of cumulative oil production changes of different types of gas injection wells in the first cycle.

1) Analysis of Cyclic Oil Production Changes:

According to Table 2, a comparison chart of cumulative oil production changes of different types of gas injection wells in the first cycle (FIG. 5) and a multi-cycle cumulative oil production variation diagram of different types of gas injection wells (FIG. 6) are made. As can be seen from FIG. 5, the oil production of weathering crust genesis gas injection wells is obviously higher than that of fault-controlled with the increase of the number of gas injection cycles. After multi-cycle production, karst cave type gas injection wells have higher initial production than fracture-vug type gas injection wells, and also have a slightly lower decline rate and a slightly better oil production effect. The production curves of typical wells also show the difference in gas injection oil increase effect of different types of wells in different gas injection cycles.

(2) Validity Period:

In the present embodiment, the change of cyclic validity period is recorded for different types of gas injection wells. With the increase of the number of cycles, the cyclic validity period shows a trend of decreasing round by round. Statistical results of cyclic validity period of different types of gas injection wells are shown in Table 3.

TABLE 3

Statistics on Cyclic Validity Period of Different Types of Gas Injection Wells

| Type | | First cycle | | Second cycle | | Third cycle | |
|---|---|---|---|---|---|---|---|
| | | Well number | Validity period d | Well number | Validity period d | Well number | Validity period d |
| Weathering crust | Karst cave type | 14 | 240 | 5 | 145 | 2 | 120 |
| | Fracture-vug type | 16 | 210 | 5 | 145 | | |
| Fault-controlled | Karst cave type | 5 | 211 | 1 | 139 | 1 | 101 |
| | Fracture-vug type | 5 | 186 | | | | |
| Total/Average | | 40 | 238 | 11 | 144 | 3 | 114 |

As can be seen from the table, the validity period of weathering crust genesis gas injection wells is obviously longer than that of fault-controlled genesis gas injection wells. Under the same geological genesis, the validity period of karst cave type gas injection wells is longer than that of fracture-vug type gas injection wells. In addition, with the increase of the number of gas injection cycles, the validity period tends to decrease gradually. For different types of gas injection wells, the validity period in the second cycle decreases obviously.

(3) Water Cut

Figure 9:
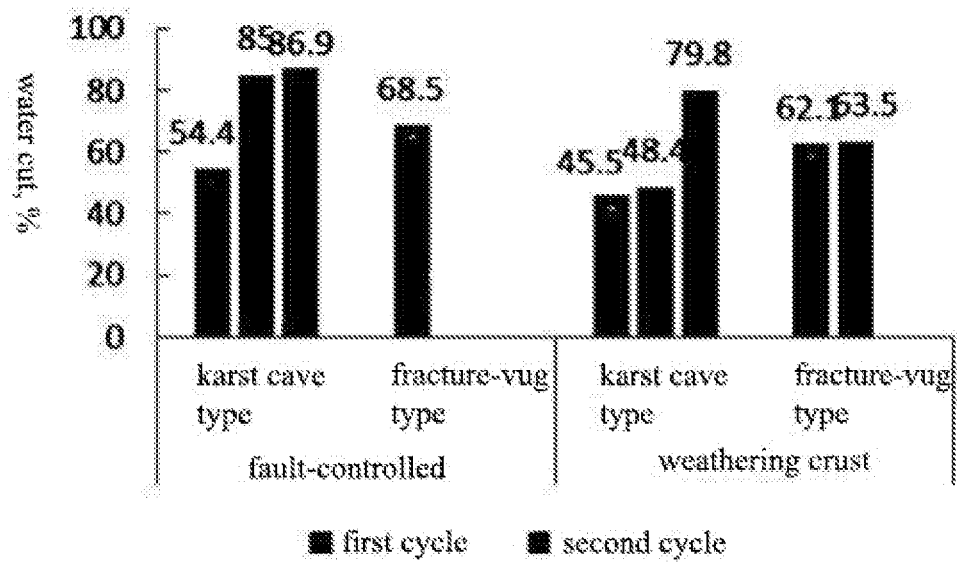
FIG. 9 is a multi-cycle water cut variation diagram of different types of gas injection wells.

In the present embodiment, the change of cyclic water cut is recorded for different types of gas injection wells. With the increase of the number of cycles, the cyclic water cut shows a trend of increasing round by round. Statistical results of cyclic water cut of different types of gas injection wells are shown in Table 4.

cut before gas injection, with an average water cut of more than 80%. Compared with the water cut before gas injection, different types of gas injection wells have a precipitation effect. As can be seen from FIG. 9, with the increase of the number of gas injection cycles, the cyclic average water cut generally shows an upward trend, the water cut of fault-controlled cave type gas injection wells rises the fastest, while the water cut of weathering crust genesis gas injection wells rises relatively slowly.

Figure 10:
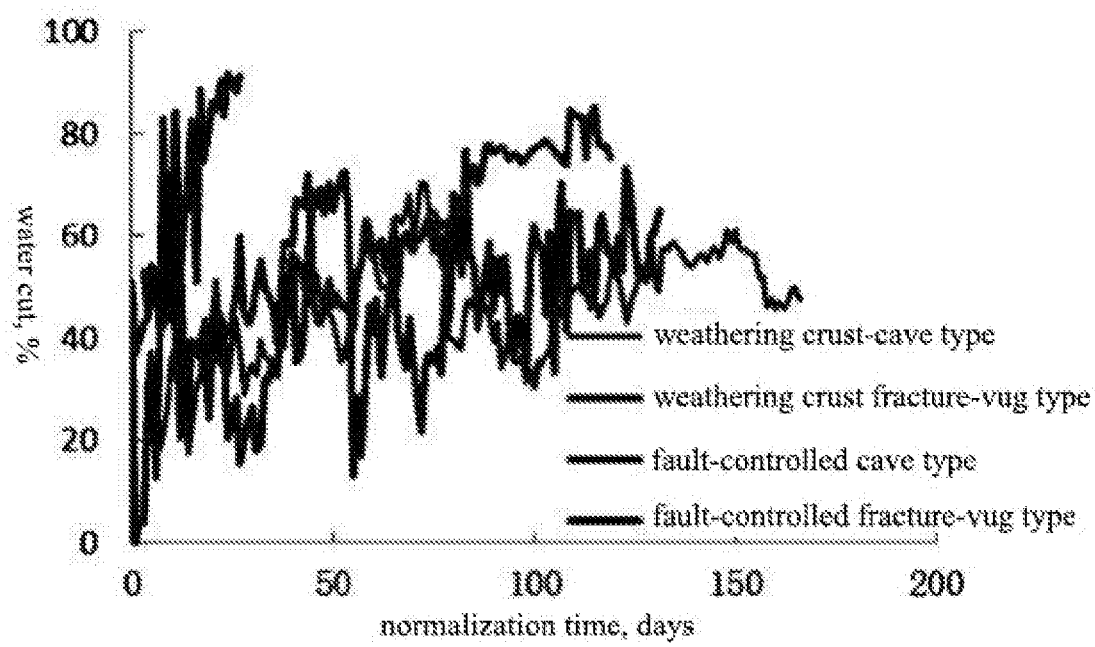
FIG. 10 is a comparison chart of water cut of different types of gas injection wells in the first cycle.

By normalizing the water cut of different types of gas injection wells, water cut variation curves of different types of gas injection wells in the first cycle are made (FIG. 10). Comparing the water cut of different types of gas injection wells in the first cycle, it can be seen that in the same cycle, the water cut of weathering crust cave type gas injection wells rises the slowest, and the water cut of fault-controlled fracture-vug type gas injection wells rises the fastest. The water cut of karst cave type gas injection wells can be kept relatively stable in the early stage, and will increase greatly after bottom water rises to a shaft bottom as the number of gas injection cycles increases in the later stage. For fracture-vug type gas injection wells, with the increase of the number

TABLE 4

Statistics on Cyclic Water Cut of Different Types of Gas Injection Wells

| Type | | First cycle | | Second cycle | | Third cycle | | Water cut at the final stage |
|---|---|---|---|---|---|---|---|---|
| | | Well number | Water cut % | Well number) | Water cut % | Well number) | Water cut % | after gas injection t |
| Weathering crust | Karst cave type | 14 | 45.5 | 5 | 48.4 | 2 | 79.8 | 3357 |
| | Fracture-vug type | 16 | 62.1 | 5 | 63.5 | | | 2334 |
| Fault-controlled | Karst cave type | 5 | 54.4 | 1 | 85 | 1 | 86.9 | 1990 |
| | Fracture-vug type | 5 | 68.5 | | | | | 1582 |
| Total/Average | | 40 | 56 | 11 | 58.6 | 3 | 82.2 | 2848 |

Figure 8:
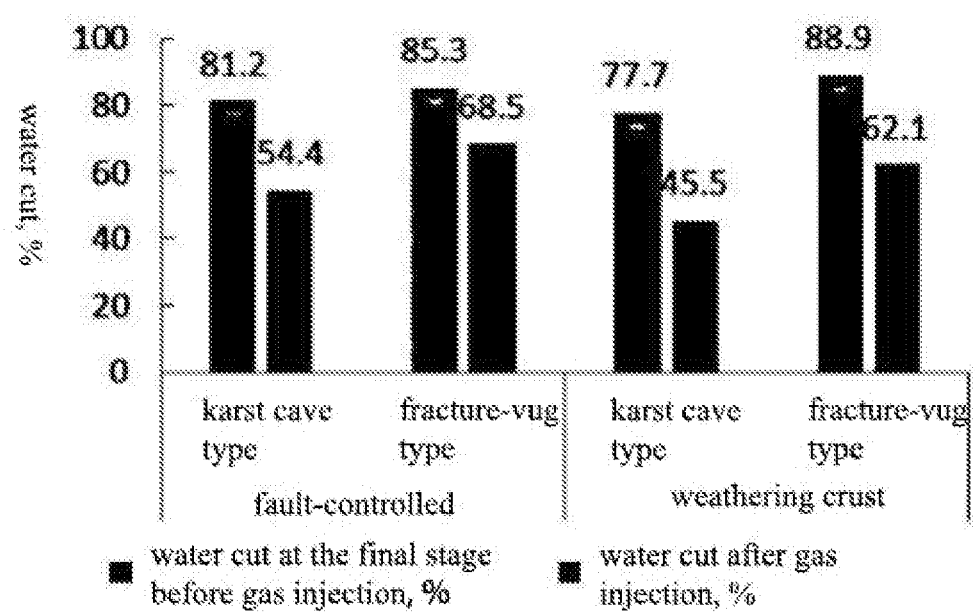
FIG. 8 is a water cut variation diagram before and after gas injection for different types of gas injection wells.

According to Table 4, a water cut variation diagram before and after gas injection for different types of gas injection wells (FIG. 8) and a multi-cycle water cut variation diagram of different types of gas injection wells (FIG. 9) are made. As can be seen from FIG. 8, most oil wells have a high water of gas injection cycles, bottom water dashes along fractures and the water cut rises rapidly.

(4) Pressure:

The wellhead pressure of gas injection wells is divided into three stages: gas injection, soaking and production. Generally speaking, during gas injection, the wellhead oil pressure rises gradually and tends to be stable; during soaking, the wellhead oil pressure is mostly relatively stable, with a slight increase or decrease; and after gas injection and well opening, the wellhead oil pressure gradually decreases and tends to be stable.

(1) Pressure Change During Soaking

Pressure changes during soaking can be broadly divided into three types:

pressure stable type: after water injection displacement, the wellhead oil pressure is stable, such reservoir space is well developed and has a medium to large scale, and gas injection takes effect easily;

pressure drop type: after water injection displacement, the wellhead oil pressure continues to drop, such reservoir space is well developed and has a medium to large scale, and gas injection takes effect easily;

and pressure rise type: after water injection displacement, the wellhead oil pressure continues to rise, even higher than the maximum pressure during gas injection. In this type of well, the pressure rises due to the back channeling of injected gas under the condition of fracture development. This type of well generally has a small reservoir space and a poor gas injection oil increase effect.

Figure 11:
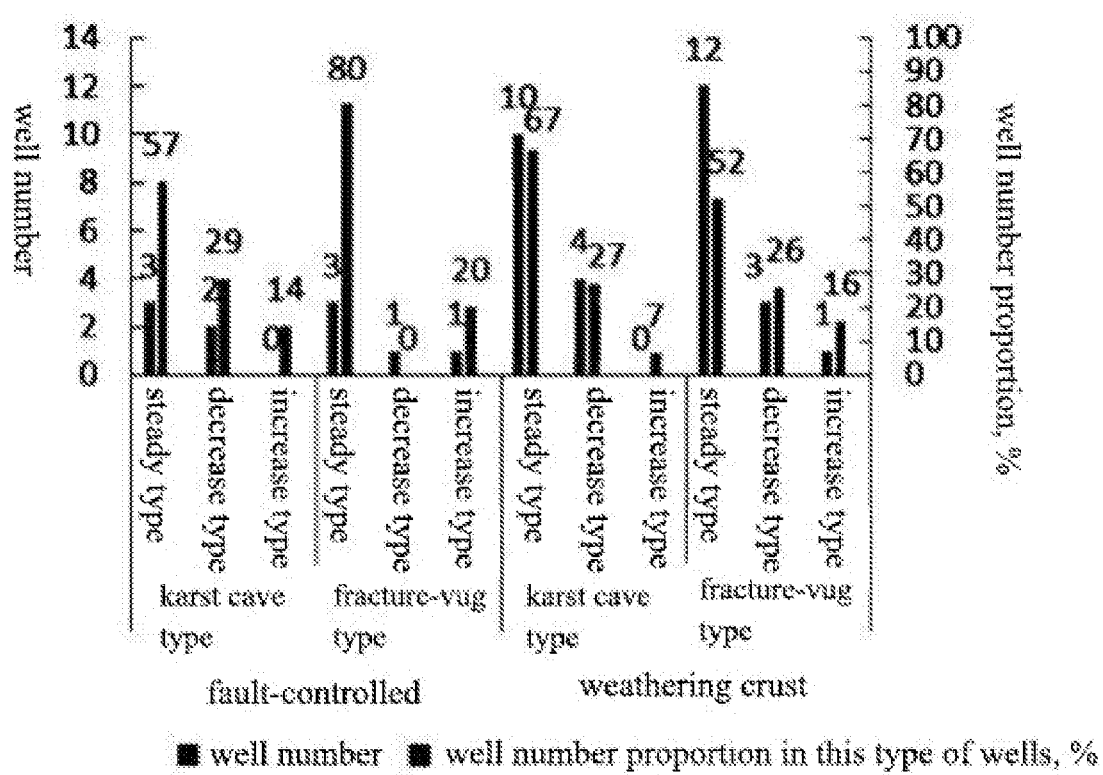
FIG. 11 shows the soak pressure characteristics of different types of gas injection wells.

FIG. 11 shows the soaking pressure characteristics of different types of gas injection wells. After statistical analysis of 40 gas injection wells, the soaking pressure of various types of wells is mainly stable, and the ratio of pressure rise type is higher in fault-controlled genesis wells than in weathering crust genesis wells.

(2) Pressure Change During Production After Gas Injection

By normalizing the pressure of different types of gas injection wells, the pressure variation curves of different types of gas injection wells in the first cycle are made. Comparing the pressure change of different types of gas injection wells during production in the first cycle, it can be seen that in the same cycle, the oil pressure of weathering crust cave type gas injection wells drops slowly, the oil pressure of fault-controlled fracture-vug type gas injection wells drops the fastest, and the pressure level is the lowest. Compared with the multi-cycle water cut variation curves of gas injection wells, it can be seen that the cyclic oil pressure drops of karst cave type and fracture-vug type gas injection wells both become slow. The water cut of karst cave type gas injection wells can be kept relatively stable in the early stage, and will increase greatly after bottom water rises to a shaft bottom as the number of gas injection cycles increases in the later stage. For fracture-vug type gas injection wells, with the increase of the number of gas injection cycles, bottom water dashes along fractures and the water cut rises rapidly.

(f) Carrying out statistics on cumulative oil production after gas injection of each typical well, and selecting inefficient wells; and according to the results of steps (d) and (e), analyzing the differences between the inefficient wells and non-inefficient wells in production characteristics and production dynamic change characteristics, so as to obtain the low efficiency reasons for geological classifications corresponding to different inefficient wells:

In the present embodiment, a total of 8 gas injection wells have poor gas injection effects and have not reached the economic limit of 649 t, so these 8 wells are inefficient wells. By further considering production characteristics and production performance change characteristics, the 8 inefficient wells are divided into the following four categories according to the causes of low efficiency: underdeveloped reservoir and small reserve scale; gas injection wells whose well overflow outlet is at the upper part of a reservoir according to a well-reservoir relationship; condensate gas cap effect; and insufficient gas injection.

Of the 8 inefficient wells in the present embodiment, a total of 5 wells belong to the category of underdeveloped reservoir and small reserve scale. For these 5 wells, geological model maps can be further established based on seismic, logging, geological and dynamic data, so as to analyze the causes of poor gas injection effect in detail.

Of the 8 inefficient wells in the present embodiment, one well is a gas injection well whose well overflow outlet is at the upper part of a reservoir according to a well-reservoir relationship. The well was put into flowing production in 2004; after shaft treatment at the end of 2006, supply was sufficient and oil jacket flowing was carried out; water injection was carried out to replace oil in 2009; and after gas production in 2013, sucker-rod pump production was carried out up to now with a high water cut. A geological model of the well shows that bottom water rises to the top of the reservoir along the fracture, and there is no residual oil distribution at local high points; and after gas injection, a large amount of gas is produced during production, the gas recovery rate is high, and gas injection is ineffective.

Of the 8 inefficient wells in the present embodiment, one well has the condensate gas cap effect. The well is a weathering crust fracture-vug type reservoir with a structural location of monadnock.

Conventional completion is adopted, the gas injection interval and the production interval are consistent, and a seismic profile is mainly characterized by weak internal reflection, medium reservoir scale, strong bottom water energy and middle well-reservoir relationship. Geological modeling of the well shows that the well is a saturated reservoir with condensate gas caps at local high points. The gas cap has occupied the attic position of the roof in the mining process, so there is no residual oil distribution on the roof of such gas injection wells and the potential for gas injection oil increase is very small.

Of the 8 inefficient wells in the present embodiment, one has insufficient gas injection. The well is located to the north of a pinch-out line, with a structural location of a monadnock platform. The well is a weathering crust cave type reservoir, conventional completion is adopted, and the well depth of the production interval is consistent with that of the gas injection interval. In the drilling process, the dropout is blown off. The dropout interval is completely consistent with the production interval, and the dropout amount is large. The dropout is blown off 9 m in a targeted manner in a horizontal section, 55 m away from an interface. The seismic profile is characterized by strong beaded reflection, fracture development and large reservoir scale. The energy of bottom water is strong, and the well-reservoir relationship is at the upper part. The geological modeling of the well shows that there is still a certain amount of residual oil at the upper part of the horizontal section. After the first cycle of gas injection, gas recovery is only 5%, water cut rises rapidly, and the injected gas volume is not enough to inhibit bottom water, resulting in poor gas injection effect.

To sum up, the present embodiment provides the specific low-efficiency reasons of different inefficient wells in typical wells, and further provides the reasons for low gas injection efficiency corresponding to different geological classifications, systematic classification and induction are carried out on the difference in gas injection effect, and gas injection effects are effectively evaluated, so that a sufficient gas injection scheme design basis is provided for subsequent development and production increase, and a significant guiding principle is provided for later-stage gas injection and production increase of the carbonate reservoir.

Preferably, an apparatus for evaluating the difference in gas injection effect of gas injection wells in a carbonate reservoir comprises a memory, a processor and a computer program stored in the memory and executable on the processor, wherein the processor implements the steps of the method according to the embodiment when executing the computer program. Illustratively, the computer program may be divided into one or more modules/units which are stored in the memory and executed by the processor to implement the present invention. The one or more modules/units may be a series of computer program instruction segments capable of performing specific functions, and the instruction segments are used to describe the execution process of the above computer program in a computer.

The above-mentioned specific embodiments further explain the purpose, technical scheme and beneficial effects of the present invention in detail. It should be understood that the above are only specific embodiments of the present invention and are not used to limit the scope of protection of the present invention. Any modification, equivalent substitution, improvement, etc. made within the spirit and principles of the present invention should be included in the scope of protection of the present invention.

What is claimed is:

1. A method for evaluating a difference in gas injection effect of gas injection wells in a carbonate reservoir, the method comprising the following steps:
    (a) dividing karst types of different gas injection wells;
    (b) identifying and classifying reservoir types of different gas injection wells;
    (c) carrying out geological classification on different gas injection wells based on karst type division and reservoir type identification and classification results, and selecting typical wells in each geological classification;
    (d) extracting and comparing production characteristics of the typical wells after gas injection takes effect, so as to obtain differences in the production characteristics;
    (e) extracting and comparing production performance change characteristics of the typical wells after gas injection, so as to obtain differences in the production performance change characteristics;
    (f) carrying out statistics on cumulative oil production after gas injection of each typical well, and selecting inefficient wells; and
    according to the results of steps (d) and (e), analyzing differences between the inefficient wells and non-inefficient wells in the production characteristics and the production performance change characteristics, so as to obtain low efficiency reasons for geological classifications corresponding to different inefficient wells.

2. The method for evaluating the difference in the gas injection effect of the gas injection wells in the carbonate reservoir according to claim 1, wherein the production characteristics include oil production, water cut and production pressure.

3. The method for evaluating the difference in the gas injection effect of the gas injection wells in the carbonate reservoir according to claim 1, wherein the production performance change characteristics include cyclic oil production, validity period, water cut and wellhead oil pressure.

4. The method for evaluating the difference in the gas injection effect of the gas injection wells in the carbonate reservoir according to claim 3, wherein a method for extracting the water cut in the production performance change characteristics comprises the following steps: making a water cut change diagram and a multi-cycle water cut change diagram before and after gas injection for different types of typical wells, and further making multi-cycle water cut change curves for different types of typical wells.

5. The method for evaluating the difference in the gas injection effect of the gas injection wells in the carbonate reservoir according to claim 3, wherein the wellhead oil pressure in the production performance change characteristics includes pressure change during soaking and pressure change during production after gas injection.

6. The method for evaluating the difference in the gas injection effect of the gas injection wells in the carbonate reservoir according to claim 1, wherein the selection criteria of the inefficient wells is as follows: based on the results of economic evaluation in the early stage of oil field development, the typical wells whose cumulative production does not reach an economic limit are selected as the inefficient wells.

7. The method for evaluating the difference in the gas injection effect of the gas injection wells in the carbonate reservoir according to claim 1, wherein low efficiency is caused by one or more of the following four reasons: underdeveloped reservoir and small reserve scale; gas injection wells whose well overflow outlet is at the upper part of a reservoir according to a well-reservoir relationship; condensate gas cap effect; and insufficient gas injection.

8. The method for evaluating the difference in the gas injection effect of the gas injection wells in the carbonate reservoir according to claim 1, wherein during geological classification in step (c), karst type is taken as the main genesis and reservoir type as the auxiliary genesis.

9. The method for evaluating the difference in the gas injection effect of the gas injection wells in the carbonate reservoir according to claim 8, wherein in step (c), different gas injection wells are divided into the following four types: weathering crust cave type, weathering crust fracture-vug type, fault-controlled cave type and fault-controlled fracture-vug type.

10. The method for evaluating the difference in the gas injection effect of the gas injection wells in the carbonate reservoir according to claim 1, wherein in step (b), the reservoir types are identified through the fracture conditions encountered by the gas injection wells, seismic reflection characteristics and logging interpretation results, and include karst cave type, fracture-vug type and fracture type.

* * * * *